United States Patent [19]

Leoncavallo et al.

[11] Patent Number: 4,689,147

[45] Date of Patent: Aug. 25, 1987

[54] PLASTIC FILTER ASSEMBLY

[75] Inventors: Richard A. Leoncavallo, Pittsford; Peter K. Baird, Honeoye Falls; Ravinder C. Mehra, Fairport; Sharad Rajguru, Rochester, all of N.Y.

[73] Assignee: Nalge Company, Rochester, N.Y.

[21] Appl. No.: 780,928

[22] Filed: Sep. 27, 1985

[51] Int. Cl.$^4$ .................. B01D 23/28; B01D 35/00
[52] U.S. Cl. .................. 210/232; 210/455; 210/474; 210/482; 210/244; 220/300
[58] Field of Search .............. 210/232, 238, 455, 466, 210/469, 474, 475, 477, 244, 482; 220/297, 300, 301

[56] References Cited

U.S. PATENT DOCUMENTS

| | | |
|---|---|---|
| 318,465 | 5/1885 | Giberson . |
| 602,488 | 4/1898 | Tice et al. . |
| 987,261 | 3/1911 | Schuyler . |
| 1,060,100 | 4/1913 | King . |
| 1,958,701 | 5/1934 | Hois . |
| 2,142,914 | 1/1939 | Myers . |
| 2,170,411 | 8/1939 | Jacobs et al. . |
| 2,313,237 | 3/1943 | Hois .................. 210/238 |
| 2,401,529 | 6/1946 | Varney et al. . |
| 2,547,794 | 4/1951 | Stone . |
| 2,595,538 | 5/1952 | Rausch . |
| 2,660,315 | 11/1953 | Lasky . |
| 2,681,147 | 6/1954 | Braswell . |
| 2,738,721 | 3/1956 | Hubbard . |
| 2,920,788 | 1/1960 | Emerson .................. 220/301 |
| 3,085,689 | 4/1963 | Hering et al. .................. 210/232 |
| 3,160,000 | 12/1964 | Mosher .................. 210/232 |
| 3,361,261 | 1/1968 | Fairey et al. .................. 210/455 |
| 3,471,019 | 10/1969 | Trasen et al. . |
| 3,565,256 | 2/1971 | Loeffler .................. 210/321 |
| 3,658,183 | 4/1972 | Best et al. .................. 210/446 |
| 3,732,985 | 5/1973 | Murrell .................. 210/446 |
| 3,746,171 | 7/1973 | Thomsen .................. 210/234 |
| 3,782,083 | 1/1974 | Rosenberg .................. 210/445 |
| 3,815,754 | 6/1974 | Rosenberg .................. 210/445 |
| 3,888,765 | 6/1975 | Bolk .................. 209/352 |
| 3,993,561 | 11/1976 | Swearingen .................. 210/131 |
| 4,113,627 | 9/1978 | Leason .................. 210/446 |
| 4,148,732 | 4/1979 | Burrow et al. .................. 210/232 |
| 4,172,798 | 10/1979 | Kronsbein .................. 210/446 |
| 4,211,346 | 7/1980 | Mehra et al. .................. 222/205 |
| 4,265,303 | 5/1981 | Giurtino et al. .................. 210/433.2 |
| 4,269,712 | 5/1981 | Hornby et al. .................. 210/321.3 |
| 4,356,791 | 11/1982 | Ward et al. .................. 210/445 |
| 4,357,240 | 11/1982 | Mehra et al. .................. 210/455 |
| 4,358,377 | 11/1982 | Clark .................. 210/323.2 |
| 4,394,266 | 7/1983 | Mehra et al. .................. 210/244 |
| 4,436,700 | 3/1984 | Erickson .................. 422/102 |
| 4,444,661 | 4/1984 | Jackson et al. .................. 210/446 |
| 4,477,347 | 10/1984 | Sylva .................. 210/232 |

FOREIGN PATENT DOCUMENTS 609044 11/1960 Canada .................. 220/300

Primary Examiner—Ernest G. Therkorn
Assistant Examiner—Linda S. Evans
Attorney, Agent, or Firm—Marjama & Pincelli

[57] ABSTRACT

A plastic filter assembly having an upper receiving container and a lower receiving container. Either the top or bottom container is provided with at least two recesses for receiving a locking pin in the container not having recesses. The recess has a first receiving portion and a locking portion. The locking pin has an angled engaging surface inclined with respect to longitudinal axis of the container.

60 Claims, 10 Drawing Figures

PLASTIC FILTER ASSEMBLY

BACKGROUND OF THE INVENTION

The present invention relates to an improved filter unit. More particularly, the invention is directed to a plastic filter unit having a reservoir and a receptacle which are securely held together in the assembled state yet which may be readily assembled and disassembled.

Various types of sealing means have been used in the prior art in order to hold the receptacle and the reservoir together. One such method comprises the use of a tape along the outer periphery of the two pieces which after filtration of the liquid is peeled off to allow disassembly. This method has numerous disadvantages in that the tape during transportation and storage tends to loosen to such a point that the assembly either comes apart or leaks air when a vacuum is applied to the filter unit.

Another method used to hold the assembly together is to provide mating threaded portions on the parts. However, during long periods of shelf retention the two parts are subject to loosening due to creep in the material. Threaded assembly's have a constant force which tends to unscrew the assembly. Therefore, during transit of the filter units vibration may cause loosening of parts, thereby resulting in the assembly either loosening or coming apart.

Applicant has invented an improved filter assembly which minimizes the disadvantages of the prior art. A filter assembly made in accordance with the present invention provides positive locking means to minimize or prevent loosening of the assembly during transit and storage.

SUMMARY OF THE PRESENT INVENTION

The filter unit according to the present invention comprises a reservoir and receptacle for receiving a filtrate. One of the parts is provided with at least two projections for placement in a corresponding recess in the other part. Each recess has a locking portion.

DESCRIPTION OF THE PREFERRED EMBODIMENT

Figure 1:
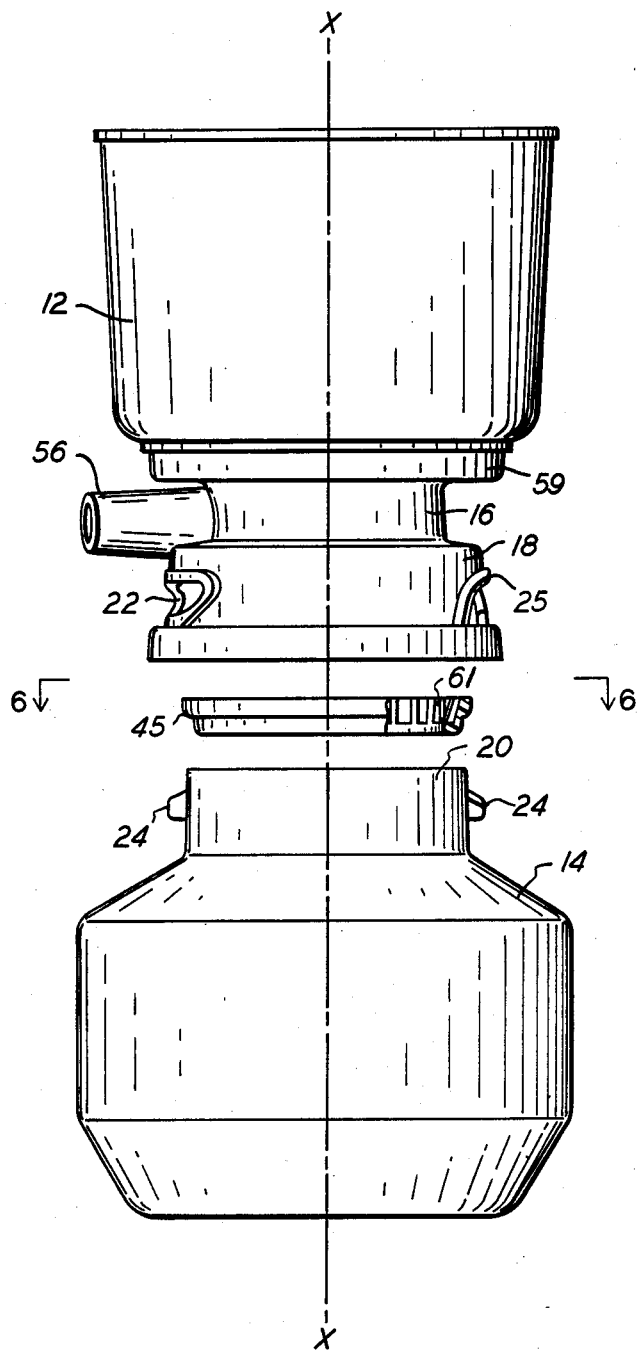
FIG. 1 is an exploded plan view of a filter unit according to present invention.

Referring to FIGS. 1, 2, 3, and 4(a, b, c, d) there is illustrated a plastic filter assembly 10 comprising an upper receiving container 12 for receiving a liquid to be filtered and a lower receiving container 14 for receiving the filtrate from the upper receiving container 12. In the particular embodiment illustrated the plastic material which filter assembly 10 is made from is polystyrene. The upper receiving container 12 has a lower end 16 having a substantially cylindrical outer wall 18. The lower container 14 is provided with a substantially cylindrical wall 20 at its upper end for placement within substantially cylindrical outer wall 18. The outside diameter of cylindrical wall 20 is less than the inside diameter of cylindrical outer wall 18 so that it may be easily inserted and/or removed therefrom. Cylindrical outer wall 18 is provided with at least two recesses 22 which are preferably spaced substantially equidistant about the periphery thereof for receiving a corresponding locking pin or cam follower 24 integrally formed on the outside surface of cylindrical wall 20. While aplicant has found that two recesses are adequate, any desired number of recesses may be used. Each recess 22 comprises a receiving portion 21 for entry of the cam follower 24, a ramp portion 23 adjacent the receiving portion 21 and a locking portion 27. At the other end of the ramp portion 23 there is provided indentation 28 for receiving and locking in position cam follower 24.

The lower end 16 is further provided with a second substantially cylindrical inner wall 30 spaced radially inwardly from cylindrical outer wall 18 so as to provide an annular receiving channel 32. Disposed within the channel 32 is a seal 34 which provides sealing means between upper receiving container 12 and lower receiving container 14.

Figure 4A:
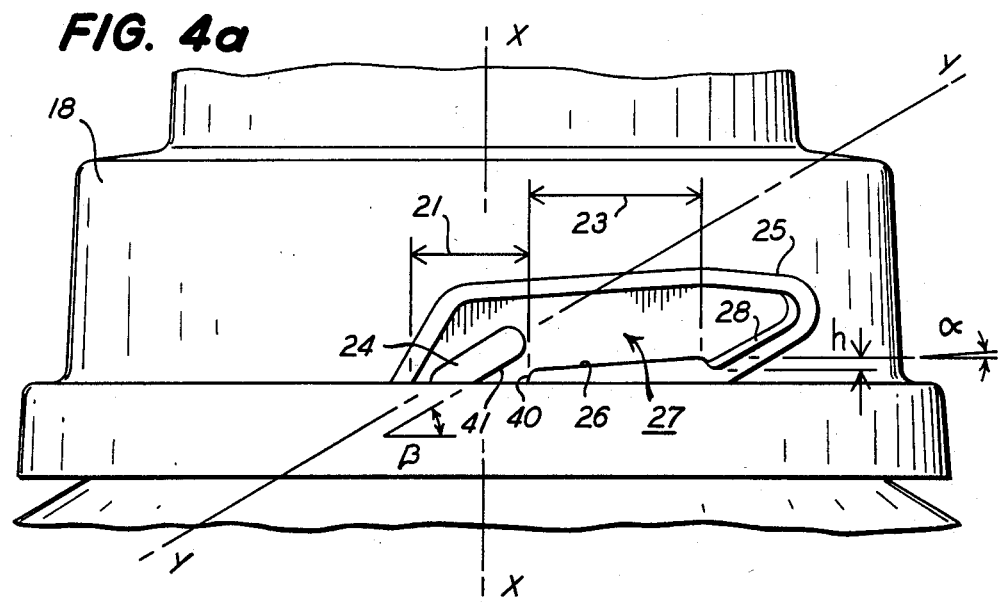
FIGS. 4a, b, c, and d are enlarged fragmentary plan views illustrating various stages of assembly of the filter unit.
Figure 4B:
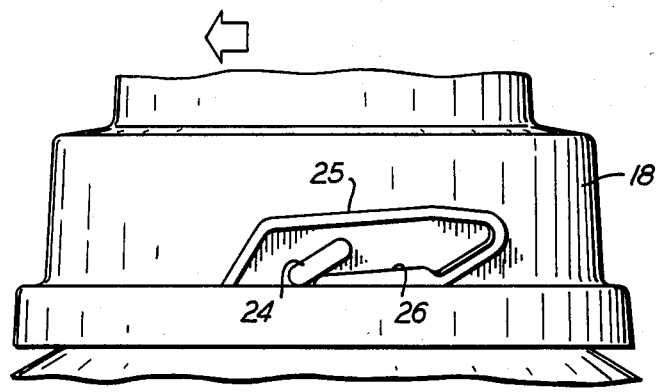
Figure 4C:
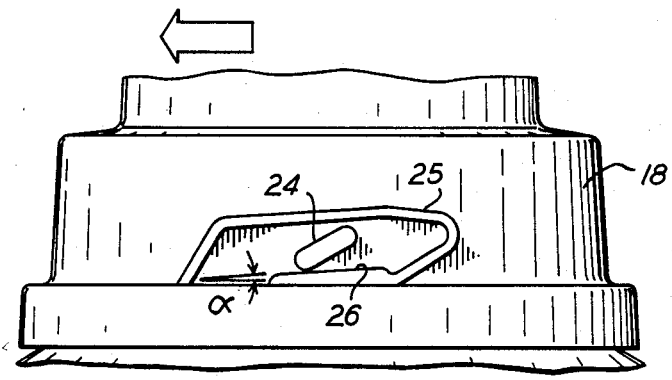
Figure 4D:
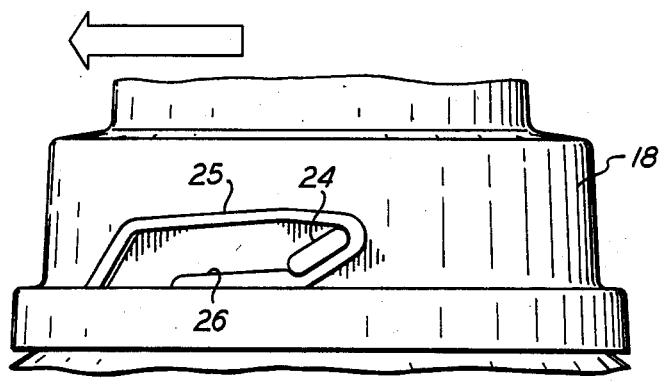

As can best be seen in FIGS. 4a, b, c, and d, the upper receiving container 12 and lower container 14 are assembled by placing each cam follower 24 in its respective receiving portion 21 of the recess 22 and bringing the two pieces closer together and then rotating the two pieces relative to each other such that the cam follower 24 rides on ramp 26 until cam follower 24 is placed in indentation 28.

Outer cylindrical wall 18 having recesses 22 is preferably made of a material different from which cam follower 24 is made from. Preferably one is made of a high impact polystyrene (generally having a high rubber content) and the other being made of a general purpose polystyrene. This provides improved wear characteristics if the assembly is to be repeatedly assembled and disassembled.

The lower end 16 of substantially cylindrical outer wall 18 is further provided with a radially extended portion 36 wherein the diameter of the inside surface of the radially extended portion 36 is substantially equal to or greater than the diameter of the outside surface of substantially cylindrical outer wall 18, to provide sufficient clearance so that cam follower 24 can easily enter into or exit from receiving portion 21 of recess 22. Radially extended portion 36 provides rigidity to the plastic filter unit so as to more evenly distribute the load and minimize or reduce stress concentrations in a small area. If radially extended portion 36 is not provided, the ramp portion 26 may deflect substantially in response to the force being applied by the seal 34 during rotation of the cam follower 24 into locking position, thereby reducing the sealing engagement of the assembly or possibly allowing undesirable stress concentrations areas to occur.

In the particular embodiment illustrated, a raised lip portion 25 is provided around the perimeter of each recess 22. This helps minimize the amount of contamination that may be deposited on cam follower 24, however, if desired, lip portion 25 may be entirely omitted (see FIG. 7) or recess 22 may be covered by a protective outer wall (not shown) integrally formed with outer wall 18.

While a substantially circular outer configuration may be used for the cam follower 24, applicants have found that cam follower 24 preferably has an outer configuration in the shape of a substantially elongated rectangle as illustrated. This configuration minimizes mold defects that may occur as a result of the mold injection process used to make containers 12 and 14 and minimizes stress concentration on cam follower 24 during assembly. The longitudinal axis Y—Y of the rectangle is inclined with respect to the longitudinal axis X—X of filter assembly 10. Cam follower 24 is provided with a substantially flat engaging surface 41 which first meets end 40 of ramp 26. During rotation of the upper receiving container with respect to lower container the cam follower 24 is caused to move both in a vertical and horizontal direction. However, during the initial stages of rotation, FIGS. 4(a) and 4(b), the force required to displace the cam follower vertically is relatively small. Once the cam follower is on the ramp 26, see FIG. 4(c), the seal 34 will be compressed to such an extent that a substantially greater force is required to cause further vertical displacement. During rotation of the assembly, when the follower 24 is in receiving portion 21, the surface 41 of cam follower as it is vertically displaced contacts the same point on end 40 of ramp 26. Whereas, when the cam follower 24 is completely on ramp 26, see FIG. 4c, as the cam follower 24 moves along ramp 26, the same point on cam follower 24 contacts ramp 26. The ramp 26 is inclined at a relatively small angle $\alpha$ of at least one degree with respect to a plane perpendicular to the longitudinal axis X—X of the assembly 10, preferably in the range of approximately 3 degrees to 8 degrees. In the particular embodiment illustrated the ramp angle $\alpha$ is approximately 5 degrees.

The outer engaging surface 41 of cam follower 24 is disposed at an angle $\beta$ as measured with respect to the longitudinal axis X—X of assembly 10, ranging from about 40 to 80 degrees, preferably in the range of 55 to 65 degrees. In the particular embodiment illustrated the engaging surface 41 of cam follower 24 is disposed at an angle $\beta$ of approximately 60 degrees with respect to longitudinal axis of the container.

Figure 7:
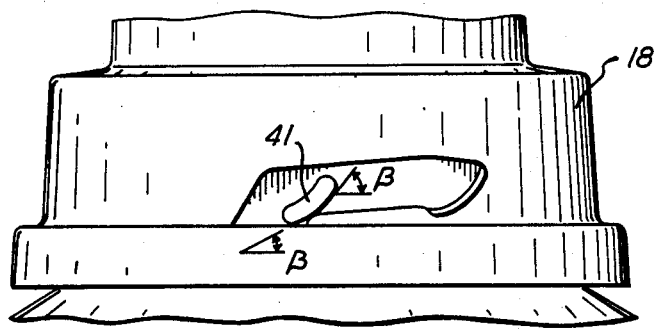
FIG. 7 is a fragmenting plan view of the filter unit illustrating a modified form of the present invention.

As previously stated, the outer configuration of cam follower 24 is preferably substantially rectangular, however various other configurations may be used, for example as illustrated in FIG. 7. In this embodiment the surface 41 is convex, preferably such that upper part is at relative low angle $\beta$ and the lower part is at relative high angle $\beta$ which approach or equals the angle $\alpha$ of ramp 26. In this way a smooth easy transition can be maintained from the low pressure zone to the high pressure zone.

Figure 2:
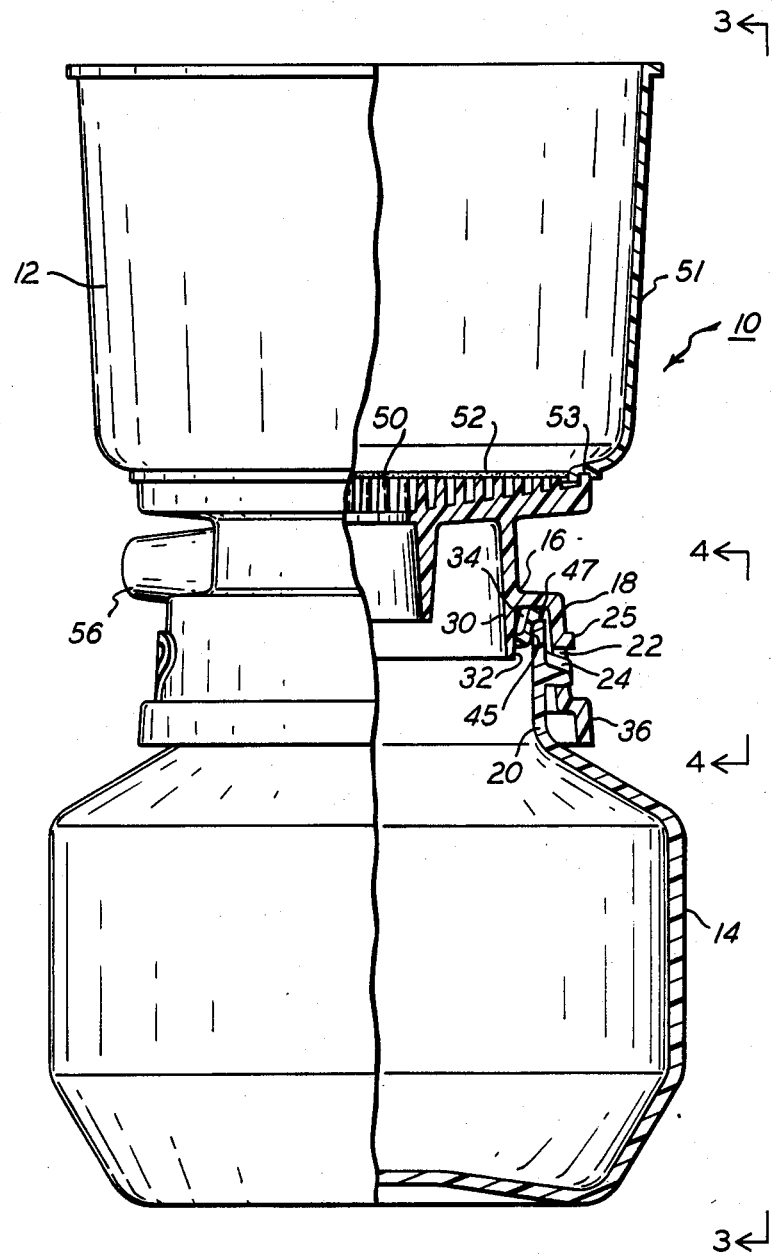
FIG. 2 is a slightly enlarged plan view partially broken away of the assembled filter unit illustrated in FIG. 1.
Figure 3:
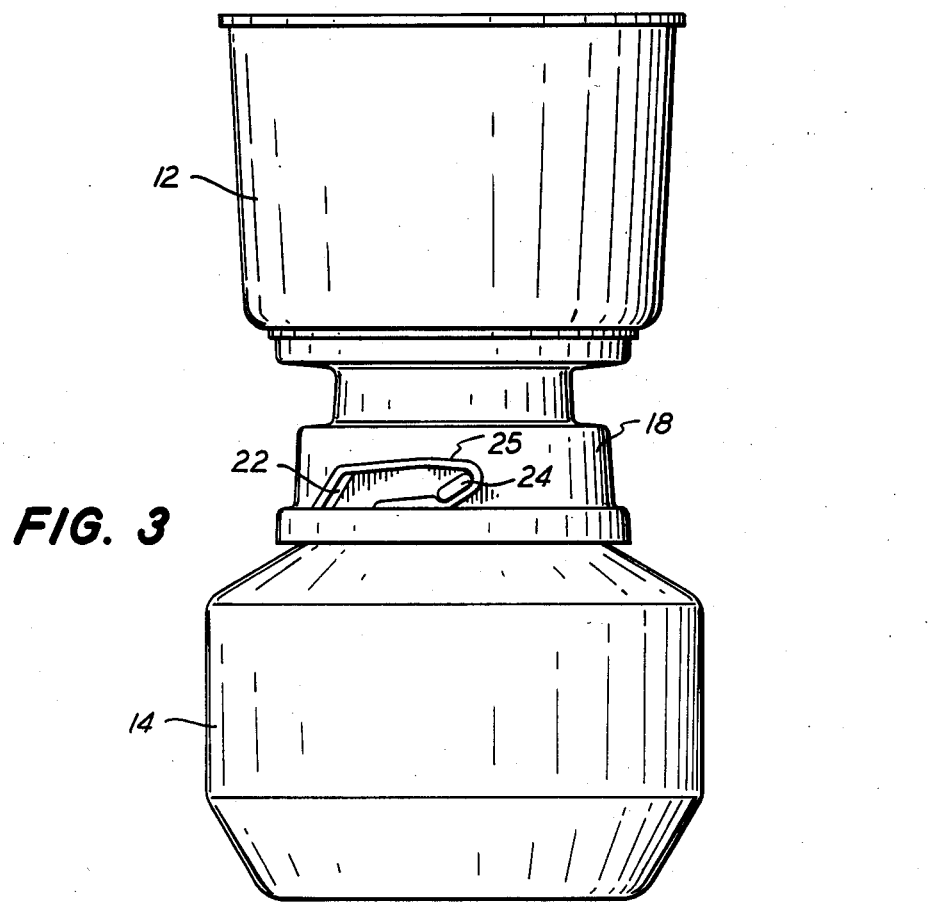
FIG. 3 is a side view of filter unit illustrated in FIG. 2.

Referring to FIG. 2 it can be seen that the seal 34 is substantially triangular in cross section and is constructed so as to provide two pressure zones in response to deflection, a relatively low pressure zone and a relatively high pressure zone. In the particular embodiment illustrated this is accomplished by providing a plurality of spaced ribs 61 disposed around the inner circumference of the seal. The outer engaging surface 45 of the seal 34 is inclined at an angle to allow the outer end of this substantially cylindrical wall to come in contact therewith. As the upper receiving container and lower receiving container are rotated, the upper end 44 of lower container 14 compresses seal 34 at lip 47 into shoulder 49. During the initial phase of assembly, the seal is very supple due to the plurality of spaced apart ribs 61 on the inside surface which allows substantially large reflections with relatively little pressure. Once the ribs 61 have been substantially deflected then the seal will have a much higher compression due to the fact the seal is undergoing substantially pure compression since the upper end 44 is the pressing directly against lip 47. The seal 34 is made of material preferably having Shore A Hardness in the range of about 35 to about 75. In the embodiment illustrated the Shore A Hardness of seal 34 is about 55. When the cam follower 24 is placed in the receiving portion of the recess 22 the seal goes into an initial compression zone which requires very little force to compress the seal 34. However, once the cam follower 24 is on the ramp surface 26 a substantially greater force is required to further compress the seal 34. When the cam follower 24 is placed into indentation 28 an equilibrium exists for the forces holding the upper receiving container and lower receiving container together. In the preferred embodiment, the seal 34 has two distinct compression zones. However, it may be possible under proper design circumstances to have only one pressure zone, more than two pressure zones, or possibly omit the seal entirely. Applicant has found the use of a seal having two pressure zones provides ease of assembly yet provides an excellent seal so that the filter unit can be used with vacuum, yet provides sufficient force to lock the assembly together when assembled.

The recesses 22 are designed such that entry by cam follower 24 and locking of the assembly occurs in a rotation which is preferably no greater than about 90 degrees, most preferably a rotation no greater than approximately 45 degrees. In the particular embodiment illustrated, the recess extends the circumferential distance of approximately 20 degrees.

In the embodiment illustrated there is provided a support plate 50 which is integrally formed with lower end 16 of upper receiving container 12 for supporting a filter membrane 52. In the actual filtration of upper container 12, the lower end 16 is separately formed and then later welded to a generally cylindrical shell 51 at 53 to form the upper container 12. However, the lower end 16 of upper receiving container need not be welded to shell 51 but may be as a separate intermediate portion which can have quick assembly/disassembly means at its upper end by constructing upper cylindrical outer wall 59 in the same manner as outer wall 18 so as to engage an outer wall (not shown) on shell 51 similar to outer wall 20 of lower container 14. This facilitates the use of two different materials for cam follower 24 and outer wall 18 having recesses 22 therein. Still further, the present invention may be modified such that the cam followers are on the inside surface of a wall and the other upstanding wall may be provided with recess which is placed within the wall having the cam follower. The filter membrane is placed on support plate 50. Openings are provided in support plate 50 to allow the filtrate to pass through the filter into the lower container 14. In the particular embodiment illustrated an evacuation port 56 is provided so as to enhance the filtration process, as is customarily done in the art.

As can be seen, the filter assembly of the present invention can be quickly and easily assembled. Once assembled the pieces will not tend to loosen as there is provided an indentation 28 which is dimensioned and shaped such that the force exerted between the parts will firmly hold the two pieces together. In the particular embodiment illustrated indentation 28 has a height h with respect to ramp 26 of about 0.008″. Once the filtration assembly has been used, the two parts are simply pressed together and rotated in opposite directions until the cam follower is in receiving portion 21, the two parts may then be simply pulled apart.

Figure 5:
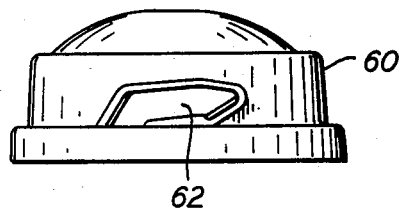
FIG. 5 is a side plan view of a cap designed to be used with the receptacle portion of the present invention after filtrate has been passed through the filter.
Figure 6:
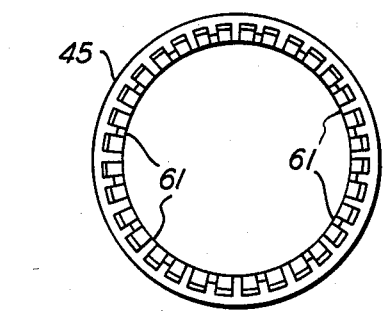
FIG. 6 is a top view of the seal illustrated in FIG. 1 taken along line 6—6 of FIG. 1.

A cap 60 as illustrated in FIG. 5 may be placed on the lower receiving container 14 so that the filtrate can be stored. This avoids pouring out of the filtrate into another vessel for storage. The cap 60 may be constructed with or without a seal as may be desired by the user. The recess 62 in cap 60 is constructed in substantially the same manner as recess 22.

The present invention can be modified in a variety of ways without departing from the scope of the present invention. For example, if desired the cam follower and recess portions may be placed on the opposite portions of the device. That is the recesses may be provided in the upper end of the lower container and the cam follower may be placed on the upper receiving container.

We claim:

1. A plastic filter assembly comprising:
   (a) an upper receiving container for receiving a liquid to be filtered having a lower end, said lower end having a substantially cylindrical outer wall;
   (b) a lower receiving container having an upper end, said upper end having a substantially cylindrical wall;
   (c) filter means disposed between said upper and lower receiving containers for filtering said liquid placed in said upper receiving container;
   (d) means for providing quick assembly or disassembly and a positive locking of said upper and lower containers, said means comprising means defining at least two recesses in either said cylindrical outer wall of said lower end of said upper container or in said cylindrical wall of said lower receiving container, each of said recesses having a first receiving portion and a locking portion, and a locking pin on said cylindrical wall or said cylindrical outer wall not having said recesses for placement in each of said recesses, said locking portion having means defining an indentation for receiving and locking in position said locking pin, said locking pin having a substantially elongated outer configuration and an engaging surface inclined with respect to longitudinal axis of said container.

2. A plastic filter assembly according to claim 1 further comprising a substantially circular resilient seal disposed between said upper and lower containers such that when said upper and lower containers are brought together and rotated into locking position said seal exerts a force between said upper and lower containers.

3. A plastic filter assembly according to claim 2 wherein said seal has means for providing two different rates of compression.

4. A plastic filter assembly according to claim 1 wherein said cylindrical outer wall has a radially extended portion at its lower end, and the inside surface of said radially extended portion has a diameter substantially equal to or greater than the diameter of the outside surface of said cylindrical outer wall.

5. A plastic filter assembly according to claim 1 wherein said engaging surface is inclined at an angle of at least about 45 degrees.

6. A plastic filter asssembly according to claim 1 wherein said engaging surface is inclined at an angle of approximately 60 degrees with respect to the longitudinal axis of said container.

7. A plastic filter assembly according to claim 1 wherein each of said recesses extends a circumferential different no greater than approximately 90 degrees.

8. A plastic filter assembly according to claim 1 wherein said locking pin has a substantially elongated configuration with an engaging surface shaped so that it forms an angle with said ramp at the point of contact, which continuously decreases as said locking pin is rotated into locking position.

9. A plastic filter assembly according to claim 1 wherein said engaging surface is disposed at an angle in the range of about 40 degrees to 80 degrees with respect to the longitudinal axis of said container.

10. A plastic filter assembly according to claim 1 wherein said engaging surface is disposed at an angle of 55 degrees to 65 degrees with respect to the longitudinal axis of said container.

11. A plastic filter assembly comprising:
   (a) an upper receiving container for receiving a liquid to be filtered having a lower end, said lower end having a substantially cylindrical outer wall;
   (b) a lower receiving container having an upper end, said upper end having a substantially cylindrical wall;
   (c) filter means disposed between said upper and lower receiving containers for filtering said liquid placed in said upper receiving container;
   (d) means for providing quick assembly or disassembly and a positive locking of said upper and lower containers, said means comprising means defining at least two recesses in said cylindrical outer wall of said lower end of said upper container, each of said recesses having a first receiving portion, a second ramp portion and a third locking portion, and a locking pin on said cylindrical wal of said lower receiving container for placement in each of said recesses, said locking portion having means defining an indentation for receiving and locking in position said locking pin, said locking pin having a substantially elongated rectangular configuration and an engaging surface which is inclined with respect to the longitudinal axis of said container.

12. A plastic filter assembly according to claim 11 further comprising a substantially circular resilient seal disposed between said upper and lower containers such that when said upper and lower containers are brought together and rotated into locking position said seal exerts a force between said upper and lower containers.

13. A plastic filter assembly according to claim 12 wherein said lower end is further provided with a substantially cylindrical inner wall spaced from said outer wall forming a channel therebetween, said seal being disposed within said channel.

14. A plastic filter assembly according to claim 12 wherein said recesses provide three pressure zones between said upper and lower containers when said locking pin is disposed within said recess and rotated through said first receiving portion, second ramp portion and third locking portion of said recess, said three pressure zones comprising a first relatively low pressure zone when said pin is in said receiving portion, a second relatively high pressure zone when said pin is in said ramp portion of said recess and an equilibrium pressure zone when said locking pin is in said third locking portion of said recess.

15. A plastic filter assembly according to claim 12 wherein said seal has means for providing two different rates of compression.

16. A plastic filter assembly according to claim 12 wherein said seal has a substantially triangular cross-sectional configuration, said seal comprising a plurality of circumferentially spaced ribs around the inside surface of said seal such that when said seal is compressed the seal deforms at a first compression rate when the upper and lower container are rotated through said receiving portion and a second compression rate when said upper and lower containers are rotated through said ramp portion.

17. A plastic filter assembly according to claim 11 wherein said cylindrical outer wall has a radially extended portion at its lower end, and the inside surface of said radially extended portion has a diameter substantially equal to or greater than the diameter of the outside surface of said cylindrical outer wall.

18. A plastic filter assembly according to claim 11 wherein said engaging surface is inclined at an angle of approximately 60 degrees with respect to the longitudinal axis of said container.

19. A plastic filter assembly according to claim 11 wherein said ramp portion comprises a contact surface disposed at an angle of at last 1 degree with respect to a plane which is substantially perpendicular to the longitudinal axis of said container.

20. A plastic filter assembly according to claim 19 wherein said contact surface is inclined at an angle in the range of 3 degrees to 8 degrees with respect to a plane substantially perpendicular to the longitudinal axis of said container.

21. A plastic filter assembly according to claim 19 wherein said contact surface is inclined at an angle of approximately 5 degrees with respect to a plane substantially perpendicular to the longitudinal axis of said container.

22. A plastic filter assembly according to claim 13 wherein each of said recesses extends a circumferential difference no greater than approximately 90 degrees.

23. A plastic filter assembly according to claim 13 wherein said recesses extends a circumferential distance no greater than about 45 degrees.

24. A plastic filter assembly according to claim 13 wherein each of said recesses extends a circumferential distance of approximately 20 degrees.

25. A plastic filter assembly according to claim 11 wherein said upper end of said lower receiving container has a radial inside wall and radial outside wall, said locking pin being disposed on said radial outside surface.

26. A plastic filter assembly according to claim 11 wherein said engaging surface is inclined at an angle of at least 45 degrees.

27. A plastic filter assembly comprising:
(a) an upper receiving container for receiving a liquid to be filtered having a lower end, said lower end having a substantially cylindrical outer wall;
(b) a receiving container having a substantially cylindrical outer wall;
(c) filter means disposed between said upper and lower receiving containers for filtering said liquid placed in said upper receiving container;
(d) means for providing quick assembly or disassembly and a positive locking of said upper and lower containers, said means comprising means defining at least two recesses in said outer wall of said upper end of said lower container, each of said recesses having a first receiving portion, a second ramp portion and a third locking portion, and a locking pin on said cylindrical wall of said upper container for placement in each of said recesses, said locking portion having means defining an indentation for receiving and locking in position said locking pin, said locking pin having a substantially elongated rectangular configuration and an engaging surface which is inclined with respect to the longitudinal axis of said container.

28. A plastic filter assembly according to claim 27 further comprising a substantially circular resilient seal disposed between said upper and lower containers such that when said upper and lower containers are brought together and rotated into locking position said seal exerts a force between said upper and lower containers.

29. A plastic filter assembly according to claim 28 wherein said lower end is further provided with a substantially cylindrical inner wall spaced from said outer wall forming a channel therebetween, said seal being disposed within said channel.

30. A plastic filter assembly according to claim 28 wherein said recesses provide three pressure zones between said upper and lower containers when said locking pin is disposed within said recess and rotated through said first receiving portion, second ramp portion and third locking portion of said recess, said three pressure zones comprising a first relatively low pressure zone when said pin is in said receiving portion, a second relatively high pressure zone when said pin is in said ramp portion of said recess and an equilibrium pressure zone when said locking pin is in said third locking portion of said recess.

31. A plastic filter assembly according to claim 28 wherein said seal has means for providing two different pressure zones during rotation of said locking pin through said recesses.

32. A plastic filter assembly according to claim 31 wherein said seal has a substantially triangular cross-sectional configuration, said seal comprising a plurality of circumferentially spaced apart ribs around the inside surface of said seal such that when said seal is compressed the seal deforms at a first compression rate when the upper and lower container are rotated through said receiving portion and a second compression rate when said upper and lower containers are rotated through said ramp portion.

33. A plastic filter assembly according to claim 27 wherein said cylindrical outer wall has a radially extended portion at its upper end, and the inside surface of said radially extended portion has a diameter substantially equal to or greater than the diameter of the outside surface of said cylindrical outer wall.

34. A plastic filter assembly according to claim 27 wherein said engaging surface is inclined at an angle of at least about 45 degrees.

35. A plastic filter assembly according to claim 27 wherein said engaging surface is inclined at an angle of approximately 60 degrees with respect to the longitudinal axis of said container.

36. A plastic filter assembly according to claim 27 wherein said locking pin has a substantially elongated configuration with an engaging surface shaped so that it forms an angle with said ramp at the point of contact, which continuously decreases as said locking pin is rotated into locking position.

37. A plastic filter assembly according to claim 27 wherein said locking pin is disposed at an angle with said ramp at the point of contact in the range of about 40 degrees to 80 degrees with respect to the longitudinal axis of said container.

38. A plastic filter assembly according to claim 27 wherein said engaging surface is disposed at an angle of 55 degrees to 65 degrees with respect to the longitudinal axis of said container.

39. A plastic filter assembly according to claim 27 wherein said ramp portion comprises a contact surface disposed at an angle of at least 1 degree with respect to a plane which is substantially perpendicular to the longitudinal axis of said container.

40. A plastic filter assembly according to claim 39 wherein said contact surface is inclined at an angle in the range of 3 degrees to 8 degrees with respect to a plane substantially perpendicular to the longitudinal axis of said container.

41. A plastic filter assembly according to claim 39 wherein said contact surface is inclined at an angle of approximately 5 degrees with respect to a plane substantially perpendicular to the longitudinal axis of said container.

42. A plastic filter assembly according to claim 27 wherein each of said recesses extends a circumferential difference no greater than approximately 90 degrees.

43. A plastic filter assembly according to claim 27 wherein each of said recesses extends a circumferential distance no greater than about 45 degrees.

44. A plastic filter assembly according claim 27 wherein each of said recesses extends a circumferential distance of approximately 20 degrees.

45. A plastic filter assembly according to claim 27 wherein said outer wall of said upper receiving container has a radial inside surface and a radial outside surface, and said locking pin is disposed on said outside wall.

46. A plastic filter assembly comprising:
(a) an upper receiving container for receiving a liquid to be filtered having a lower end, said lower end having a substantially cylindrical outer wall and a substantially cylindrical inner wall spaced from said outer wall to form a channel therebetween, said cylindrical outer wall having a radially extended portion at its lower end, the inside surface of said radially extended portion having a radius substantially equal to or greater than the radius of the outside surface of said cylindrical outer wall;
(b) a lower receiving container having an upper end, said upper end having a substantially cylindrical wall having a radially inside surface and a radially outside surface;
(c) filter means disposed between said upper and lower receiving containers for filtering said liquid placed in said upper receiving container;
(d) means for providing quick assembly or disassembly and locking said upper and lower containers, said means comprising means defining at least two recesses in said outer wall of said lower end of said upper container, each of said recesses having a first receiving portion, a second ramp portion and a third locking portion, a locking pin on the radially outside surface of said upper end of said lower container for placement in each of said recesses respectively and an annular resilient seal disposed within said channel so that when said upper and lower containers are brought together and rotated a force is exerted between said upper and lower containers, said locking portion having means defining an indentation for receiving and locking in position said locking pin, said locking pin having a substantially elongated rectangular configuration and an engaging surface which is inclined with respect to the longitudinal axis of said container.

47. A plastic filter assembly according to claim 46 wherein said engaging surface is inclined at an angle of at least about 45 degrees.

48. A plastic filter assembly according to claim 46 wherein said engaging surface is inclined at an angle of approximately 60 degrees with respect to the longitudinal axis of said container.

49. A plastic filter assembly according to claim 46 wherein said locking pin has a substantially elongated configuration disposed such that the engaging surface of said locking pin is shaped so that it forms an angle with said ramp at the point of contact, which continuously decreases as said locking pin is rotated into locking position.

50. A plastic filter assembly according to claim 46 wherein said engaging surface is disposed at an angle in the range of about 40 degrees to 80 degrees with respect to the longitudinal axis of said container.

51. A plastic filter assembly according to claim 46 wherein said engaging surface is disposed at an angle of 55 degrees to 65 degrees with respect to the longitudinal axis of said container.

52. A plastic filter assembly according to claim 46 wherein said ramp portion comprises a contact surface disposed at an angle of at least 1 degree with respect to a plane which is substantially perpendicular to the longitudinal axis of said container.

53. A plastic filter assembly according to claim 52 wherein said ramp portion is inclined at an angle in the range of 3 degrees to 8 degrees with respect to a plane substantially perpendicular to the longitudinal axis of said container.

54. A plastic filter assembly according to claim 52 wherein said ramp portion is inclined at an angle of approximately 5 degrees with respect to a plane substantially perpendicular to the longitudinal axis of said container.

55. A plastic filter assembly according to claim 46, wherein said recesses provide three pressure zones between said upper and lower containers when said locking pin is disposed within said recess and rotated through said first receiving portion, second ramp portion and third locking portion of said recess, said three pressure zones comprising a first relatively low pressure zone when said pin is in said receiving portion, a second relatively high pressure zone when said pin is in said ramp portion of said recess and an equilibrium pressure zone when said locking pin is in said third locking portion of said recess.

56. A plastic filter assembly according to claim 46 wherein said seal has means for providing two different rates of compression.

57. A plastic filter assembly according to claim 46 wherein said seal has a substantially triangular configuration, said seal comprising a plurality of circumferentially spaced apart ribs around the inside surface of said seal such that when said seal is compressed the seal deforms at a first compression rate when the upper and lower containers are rotated through said receiving portion and a second compression rate when said upper and lower containers are rotated through said ramp portion.

58. A plastic filter assembly according to claim 46 wherein each of said recesses extends a circumferential difference no greater than approximately 90 degrees.

59. A plastic filter assembly according to claim 46 wherein each of said recesses extends a circumferential distance no greater than about 45 degrees.

60. A plastic filter assembly according to claim 46 wherein each of said recesses extends a circumferential distance of approximately 20 degrees.

* * * * *